(12) United States Patent
Tasaki et al.

(10) Patent No.: US 10,976,438 B2
(45) Date of Patent: Apr. 13, 2021

(54) ESTIMATION DEVICE AND ESTIMATION METHOD

(71) Applicant: KABUSHIKI KAISHA TOSHIBA, Tokyo (JP)

(72) Inventors: Tsuyoshi Tasaki, Kanagawa (JP); Tsuyoshi Takatani, Kanagawa (JP); Mayu Okumura, Kanagawa (JP); Manabu Nishiyama, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 769 days.

(21) Appl. No.: 15/259,362

(22) Filed: Sep. 8, 2016

(65) Prior Publication Data

US 2017/0082430 A1 Mar. 23, 2017

(30) Foreign Application Priority Data

Sep. 17, 2015 (JP) .............................. JP2015-183607

(51) Int. Cl.
*G01S 17/931* (2020.01)
*G01C 21/28* (2006.01)
(Continued)

(52) U.S. Cl.
CPC ............ *G01S 17/931* (2020.01); *G01C 21/28* (2013.01); *G01S 7/4808* (2013.01); *G01S 17/58* (2013.01);
(Continued)

(58) Field of Classification Search
CPC ....... G01C 21/28; G01S 7/4808; G01S 17/58; G01S 17/936; G01S 17/931
See application file for complete search history.

(56) References Cited

U.S. PATENT DOCUMENTS 6,031,484 A * 2/2000 Bullinger .............. B60R 21/013
340/436
6,853,738 B1 * 2/2005 Nishigaki .............. G01C 3/085
348/139
(Continued)

FOREIGN PATENT DOCUMENTS

JP 2009014643 1/2009
JP 2009026250 2/2009
(Continued)

*Primary Examiner* — Catherine T. Rastovski
*Assistant Examiner* — Liam R Casey
(74) *Attorney, Agent, or Firm* — Nixon & Vanderhye, P.C.

(57) ABSTRACT

According to an embodiment, a device includes processing circuitry. The processing circuitry performs three-dimensional measurement of surroundings of a mobile object to obtain a three-dimensional point group. The processing circuitry calculates movement information. The processing circuitry makes a threshold value based on time series differences in the movement information. The processing circuitry extracts, from the three-dimensional group, three-dimensional points having distance to the mobile object in a moving direction of the mobile object to be equal to or smaller than the threshold value. The processing circuitry divides space, in which the three-dimensional points are present, into divided spaces in the moving direction. The processing circuitry selects a representative point for the divided space from among three-dimensional points included in the divided space. The processing circuitry estimates, as a surface for motion on which the mobile object moves, a surface which approximates the representative points.

9 Claims, 10 Drawing Sheets

(51) Int. Cl.
*G06K 9/00* (2006.01)
*G01S 17/58* (2006.01)
*G01S 17/89* (2020.01)
*G01S 7/48* (2006.01)
*G08G 1/16* (2006.01)
*G01C 21/16* (2006.01)

(52) U.S. Cl.
CPC .......... *G01S 17/89* (2013.01); *G06K 9/00805* (2013.01); *G08G 1/166* (2013.01); *G01C 21/165* (2013.01)

(56) References Cited

U.S. PATENT DOCUMENTS

| | | | | |
|---|---|---|---|---|
| 6,947,064 | B1* | 9/2005 | Hahn | G08G 1/0962 345/427 |
| 6,963,657 | B1* | 11/2005 | Nishigaki | G01S 11/12 340/901 |
| 8,848,978 | B2 | 9/2014 | Yankun et al. | |
| 9,561,796 | B2* | 2/2017 | Mielenz | G08G 1/167 |
| 2005/0125131 | A1* | 6/2005 | Kato | B60T 8/172 701/70 |
| 2007/0127777 | A1* | 6/2007 | Fujimoto | G06K 9/00798 382/104 |
| 2007/0164854 | A1* | 7/2007 | Hill | G09F 7/20 340/457 |
| 2010/0034426 | A1 | 2/2010 | Takiguchi et al. | |
| 2010/0114416 | A1* | 5/2010 | Au | G01C 21/165 701/23 |
| 2010/0125399 | A1* | 5/2010 | Grolle | B60W 10/184 701/96 |
| 2010/0246896 | A1* | 9/2010 | Saito | G06K 9/00798 382/106 |
| 2011/0235861 | A1* | 9/2011 | Nitanda | G06K 9/00798 382/103 |
| 2013/0010074 | A1 | 1/2013 | Takiguchi et al. | |
| 2013/0011013 | A1 | 1/2013 | Takiguchi et al. | |
| 2014/0085106 | A1* | 3/2014 | Clifford | G08G 1/163 340/903 |
| 2014/0149013 | A1* | 5/2014 | Matsuno | G08G 1/166 701/70 |
| 2015/0060608 | A1* | 3/2015 | Carlson | B60T 8/1705 246/122 R |
| 2016/0012299 | A1* | 1/2016 | Maeda | G06K 9/00798 382/104 |

FOREIGN PATENT DOCUMENTS

JP 2009204615 9/2009
JP 2013065304 4/2013

* cited by examiner

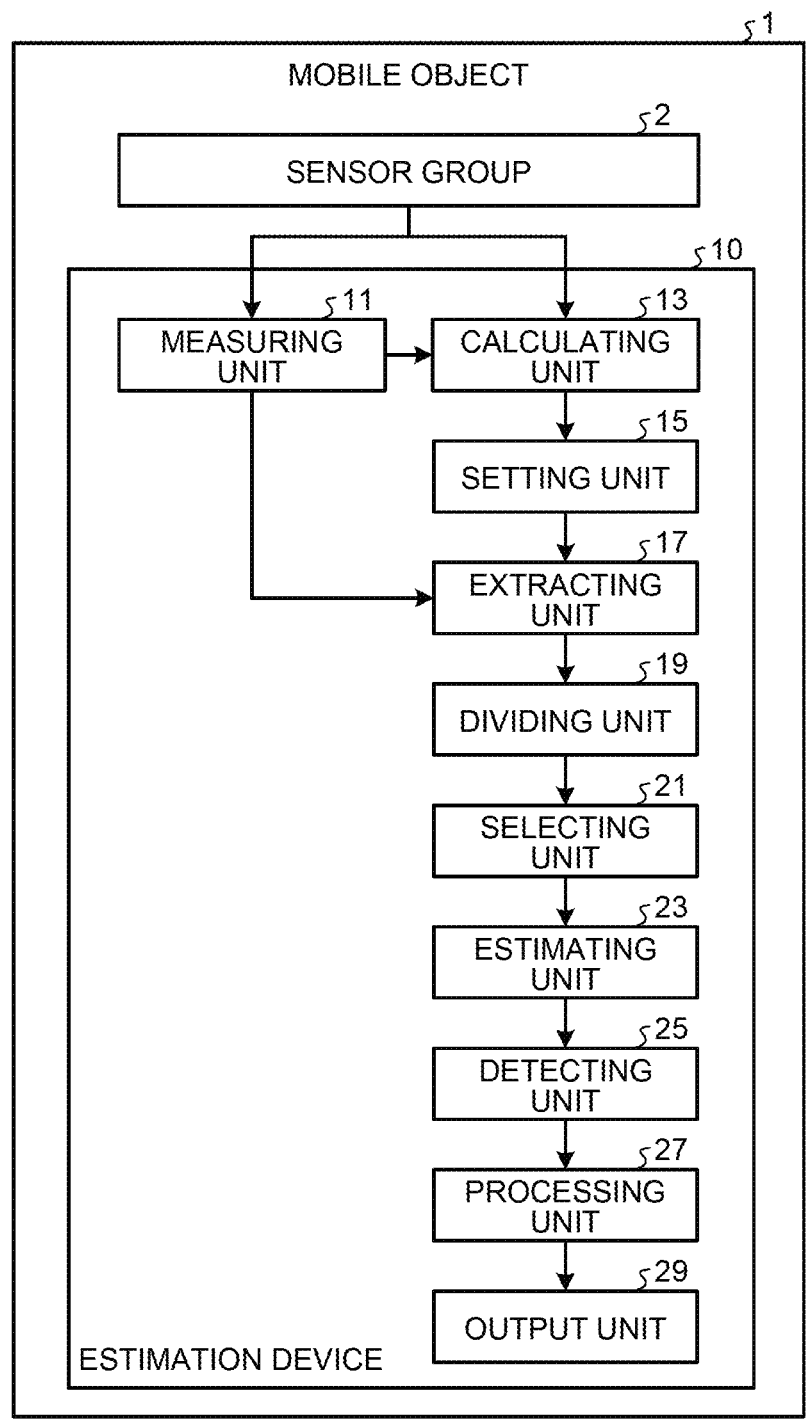

ESTIMATION DEVICE AND ESTIMATION METHOD

CROSS-REFERENCE TO RELATED APPLICATIONS

This application is based upon and claims the benefit of priority from Japanese Patent Application No. 2015-183607, filed on Sep. 17, 2015; the entire contents of which are incorporated herein by reference.

FIELD

An embodiment described herein relates generally to an estimation device and an estimation method.

BACKGROUND

Typically, a technology is known in which three-dimensional measurement of the surroundings of a mobile object, such as a running vehicle, is performed using a camera installed in the mobile object, and the three-dimensional measurement result is used in estimating a flat surface (for example, the surface for motion such as the road surface).

BRIEF DESCRIPTION OF THE DRAWINGS

FIG. 1 is diagram illustrating an exemplary configuration of an estimation device according to an embodiment;

DETAILED DESCRIPTION

Figure 2A:
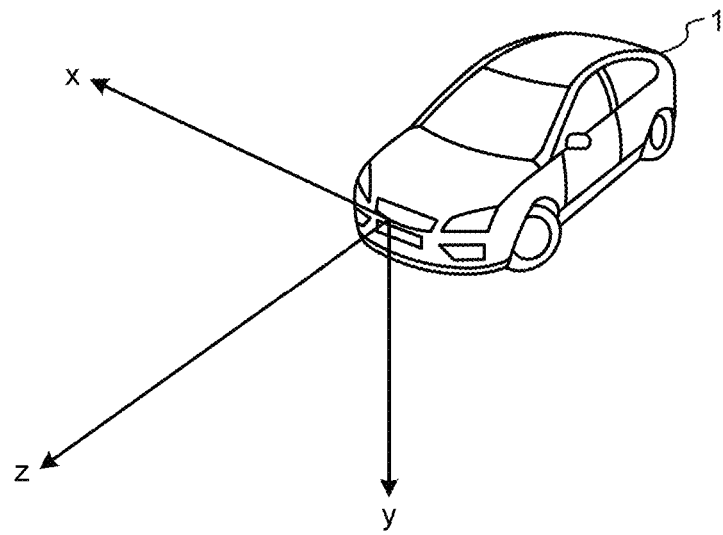
FIG. 2A is a diagram illustrating an exemplary coordinate system of a three-dimensional point group according to the embodiment.

According to an embodiment, an estimation device includes processing circuitry. The processing circuitry performs three-dimensional measurement of surroundings of a mobile object to obtain a three-dimensional point group. The processing circuitry calculates movement information which varies accompanying movement of the mobile object. The processing circuitry makes a threshold value based on time series differences in the movement information. The processing circuitry extracts, from the three-dimensional group, a plurality of three-dimensional points having distance to the mobile object in a moving direction of the mobile object to be equal to or smaller than the threshold value. The processing circuitry divides space, in which the plurality of three-dimensional points are present, into a plurality of divided spaces in the moving direction. The processing circuitry selects a representative point for the divided space from among three-dimensional points included in the divided space. The processing circuitry estimates, as a surface for motion on which the mobile object moves, a surface which approximates the representative points.

An embodiment will be described below in detail with reference to the accompanying drawings.

FIG. 1 is diagram illustrating an exemplary configuration of an estimation device 10 according to the embodiment. The estimation device 10 is installed in a mobile object 1 having a sensor group 2; and includes a measuring unit 11, a calculating unit 13, a setting unit 15, an extracting unit 17, a dividing unit 19, a selecting unit 21, an estimating unit 23, a detecting unit 25, a processing unit 27, and an output unit 29.

In the embodiment, the explanation is given for an example in which the mobile object 1 is a vehicle such as an automobile that moves on the road surface serving as the surface for motion. However, that is not the only possible case. Alternatively, for example, the mobile object 1 can be a ship that moves on the water surface serving as the surface for motion, or can be a robot that moves on the floor surface serving as the surface for motion. That is, as long as the object is capable of moving on the surface for motion, it serves the purpose.

The sensor group 2 includes a sensor used for three-dimensional measurement and a sensor used in calculating movement information which varies accompanying the movement of the mobile object 1. Herein, the sensor used for three-dimensional measurement and the sensor used for movement information calculation either can be the same sensor or can be different sensors.

As the sensor used for three-dimensional measurement, it is possible to use, for example, at least one of a laser sensor and an image sensor (camera). As the sensor used for movement information calculation, it is possible to use, for example, at least one of a laser sensor, an image sensor, an angular velocity sensor, and an acceleration sensor.

The sensor group 2 outputs detection information to the estimation device 10.

The estimation device 10 estimates the surface for motion on which the mobile object 1 moves. Examples of the estimation device 10 include a computer. The measuring unit 11, the calculating unit 13, the setting unit 15, the extracting unit 17, the dividing unit 19, the selecting unit 21, the estimating unit 23, the detecting unit 25, the processing unit 27, and the output unit 29 can be implemented by making a processor such as a central processing unit (CPU) to execute computer programs, that is, can be implemented using software; or can be implemented using hardware such as an integrated circuit (IC); or can be implemented using a combination of software and hardware.

The measuring unit 11 performs three-dimensional measurement of the surroundings of the mobile object 1 to obtain a three-dimensional point group. More particularly, every time detection is performed by the sensor group 2 (more specifically, by the sensor used for three-dimensional measurement), the measuring unit 11 performs three-dimensional measurement of the surroundings of the mobile object 1 based on the detection information, to obtain a three-dimensional point group. For example, the three-dimensional point group represents a set of three-dimensional points expressed in a three-dimensional coordinate system centered on the position of the sensor used for three-dimensional measurement (in the example illustrated in FIG. 2A, it is assumed that the sensor used for three-dimensional measurement is installed in the central part of the front face of the mobile object 1).

Meanwhile, in order to perform three-dimensional measurement, the measuring unit 11 can implement a known three-dimensional measurement method.

For example, when an image sensor is used in the sensor group 2 as the sensor for three-dimensional measurement, the image sensor performs sequential imaging of the surroundings of the mobile object 1 in chronological order. Then, the measuring unit 11 detects the feature point from each of a plurality of images taken in chronological order by the image sensor; performs three-dimensional measurement according to, for example, the triangulation principle using the detected feature points of the images; and obtains three-dimensional points.

Alternatively, for example, when a laser sensor is used in the sensor group 2 as the sensor for three-dimensional measurement, the laser sensor irradiates the surroundings of the mobile object 1 with laser, and detects the phase difference between the irradiated light and the reflected light of the laser or detects the reflection period up to the reflection. Then, the measuring unit 11 performs three-dimensional measurement using the phase difference or the reflection period detected by the laser sensor, and obtains three-dimensional points.

The calculating unit 13 successively calculates movement information of the mobile object 1. More particularly, every time detection is performed by the sensor group 2 (more specifically, by the sensor used for movement information calculation), the calculating unit 13 calculates movement information of the mobile object 1 based on the detection information. The movement information represents information indicating at least one of the orientation and the speed of the mobile object 1. The orientation of the mobile object 1 is expressed, for example, using roll, pitch, and yaw in the three-dimensional coordinate system centered on the position of the sensor used for movement information calculation. In the example illustrated in FIG. 2B, the sensor used for movement information calculation is installed in the central part of the front face of the mobile object 1, and the position of the sensor of the mobile object 1 at a particular timing n is treated as the origin.

Meanwhile, in order to calculate the movement information of the mobile object 1, the calculating unit 13 can implement a known orientation calculation method or a known speed calculation method.

For example, when an image sensor is used in the sensor group 2 as the sensor for movement information calculation, the calculating unit 13 can track the feature points of the images as detected by the measuring unit 11 and calculate the orientation and the speed of the mobile object 1. Meanwhile, the calculating unit 13 itself can be configured to detect the feature point from each of a plurality of images taken in chronological order by an image sensor.

Alternatively, for example, when a laser sensor is used as the sensor for movement information calculation in the sensor group 2, the calculating unit 13 can calculate the orientation and the speed of the mobile object 1 by associating the three-dimensional points, which are obtained by the measuring unit 11, in chronological order.

Still alternatively, for example, when an angular velocity sensor and an acceleration sensor are used in the sensor group 2 as the sensors for movement information calculation, the calculating unit 13 can calculate the orientation of the mobile object 1 from the angular velocity of the mobile object as detected by the angular velocity sensor, and can calculate the speed of the mobile object 1 from the acceleration of the mobile object 1 as detected by the acceleration sensor.

The setting unit 15 sets a threshold value based on the time series differences in the movement information that is calculated by the calculating unit 13. More particularly, the setting unit 15 makes the threshold value smaller when the time series differences in the movement information calculated by the calculating unit 13 is greater. More specifically, the setting unit 15 applies, to a monotonically decreasing function, the value indicating the time series differences in the movement information, which is calculated by the calculating unit 13, and sets the resultant value as the threshold value.

For example, assume that $y=-ax+b$ (where a and b are arbitrary variables) represents a monotonically decreasing function. In that case, the setting unit 15 calculates the absolute value of the difference between the value indicating the movement information of the mobile object 1 at current timing t and the value indicating the movement information of the mobile object 1 at a calculation timing t-P that occurred P hours earlier than the current timing t. Then, the setting unit 15 substitutes the absolute value of the calculated difference in "x" in the monotonically decreasing function; and sets the resultant value of "y" as the threshold value.

It is desirable that the calculation timing t-P represents the calculation timing of the previous movement information. However, that is not the only possible case. That is, as long as the calculation timing t-P represents the calculation timing of any prior movement information including the previous movement information, it serves the purpose. When the movement information indicates the orientation of the mobile object 1, examples of the absolute value of the difference include the sum of the absolute values of differences of roll, pitch, and yaw. However, that is not the only possible case. When the movement information indicates the speed of the mobile object 1, examples of the absolute value of the difference include the absolute values of differences in speeds. However, that is not the only possible case.

Meanwhile, if the setting unit 15 sets at least one of an upper limit value and a lower limit value to the threshold value and if the obtained value of "y" exceeds the upper limit value, then the setting unit 15 rounds off (corrects) the value of "y" to the upper limit value. On the other hand, if the obtained value of "y" falls below the lower limit value, then the setting unit 15 rounds off (corrects) the value of "y" to the lower limit value.

Figure 2B:
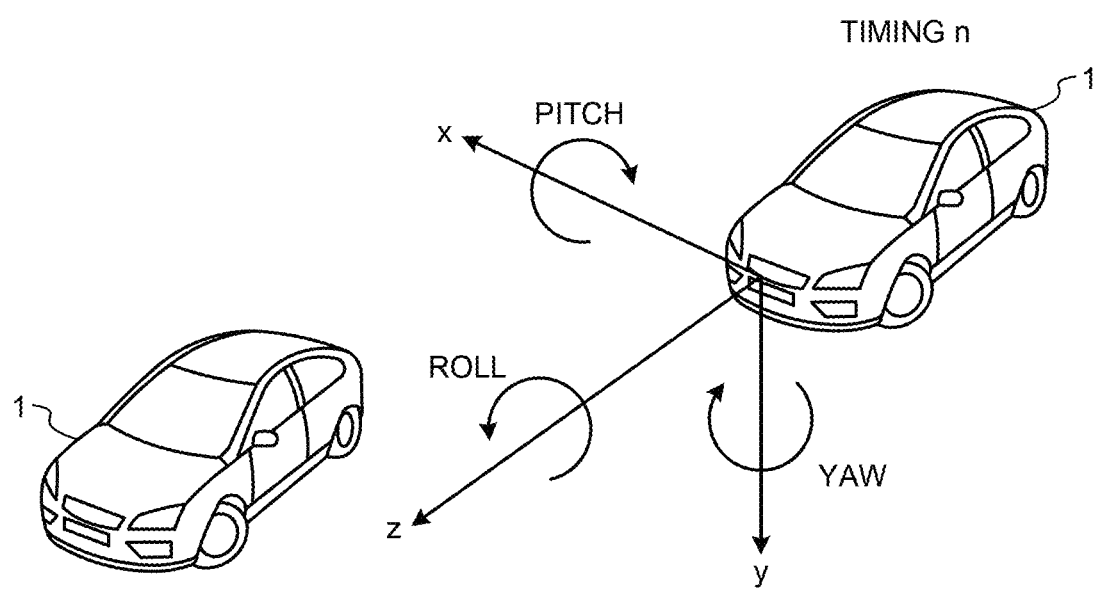
FIG. 2B is a diagram illustrating an exemplary coordinate system of the orientations of a mobile object according to the embodiment.

The extracting unit 17 extracts, from the three-dimensional point group obtained by the measuring unit 11, a plurality of three-dimensional points having the distance to the mobile object 1 in the moving direction of the mobile object 1 to be equal to or smaller than the threshold value set by the setting unit 15. When the three-dimensional point group obtained by the measuring unit 11 is expressed in the coordinate system as illustrated in FIG. 2A, the z direction (more specifically, the ±z direction) represents the moving direction of the mobile object 1.

Figure 3:
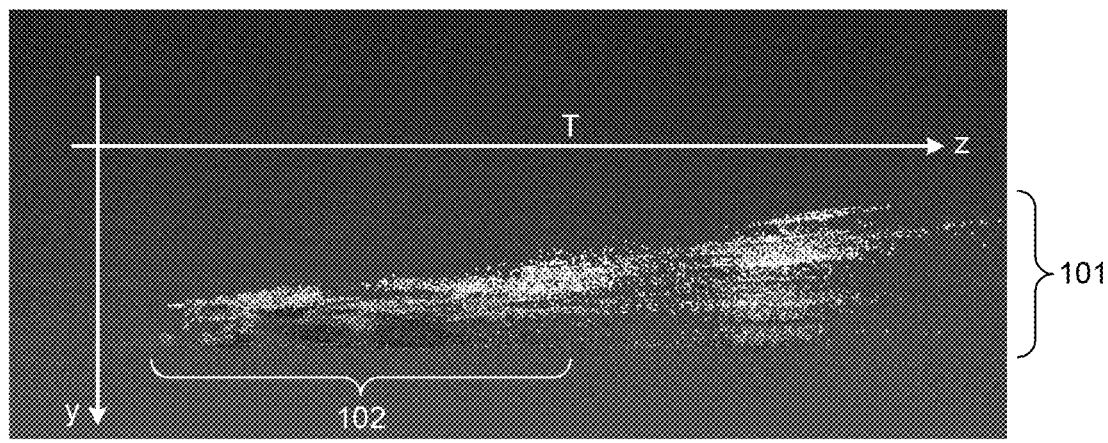
FIG. 3 is an explanatory diagram for explaining an example of an extraction method for extracting three-dimensional points according to the embodiment.

FIG. 3 is an explanatory diagram for explaining an example of the extraction method implemented by the extracting unit 17 for extracting three-dimensional points according to the embodiment. In FIG. 3, a three-dimensional point group 101 obtained by the measuring unit 11 is illustrated in the yz plane. In the example illustrated in FIG. 3, from the three-dimensional point group 101, the extracting unit 17 extracts a plurality of three-dimensional points 102 having the z-coordinate value to be equal to or smaller than a threshold value T set by the setting unit 15.

The dividing unit 19 divides the space, in which a plurality of three-dimensional points extracted by the extracting unit 17 is present, into a plurality of divided spaces alone the moving direction of the mobile object 1.

Figure 4:
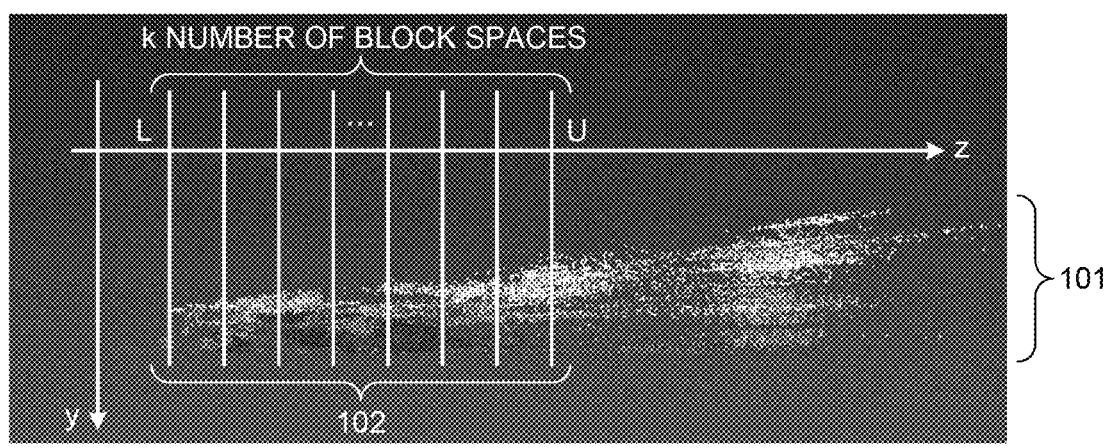
FIG. 4 is an explanatory diagram for explaining an example of a division method for dividing a space according to the embodiment.

FIG. 4 is an explanatory diagram for explaining an example of the division method implemented by the dividing unit 19 for dividing the space according to the embodiment. In FIG. 4, the three-dimensional point group 101 obtained by the measuring unit 11 and the three-dimensional points 102 extracted by the extracting unit 17 are illustrated in the yz plane. In the example illustrated in FIG. 4, the dividing unit 19 identifies a lowest coordinate value L and a highest coordinate value U of the z-coordinate values that can be taken by the three-dimensional points extracted by the extracting unit 17; evenly divides a single space, in which the z-coordinates equal to or greater than the lowest coordinate value L but equal to or smaller than the highest coordinate value U are present, into k parts (k≥2) in the z-axis direction; and forms k number of block spaces. Meanwhile, in the example illustrated in FIG. 4, U=T holds true. However, as long as U≤T holds true, the highest coordinate value U can be any arbitrary value.

For each divided space obtained by division by the dividing unit 19, the selecting unit 21 selects a representative point from among the three-dimensional points included in the divided space. More particularly, the selecting unit 21 selects, as the representative point, the lowest point in the vertical direction from among the three-dimensional points included in the divided space.

Figure 5:
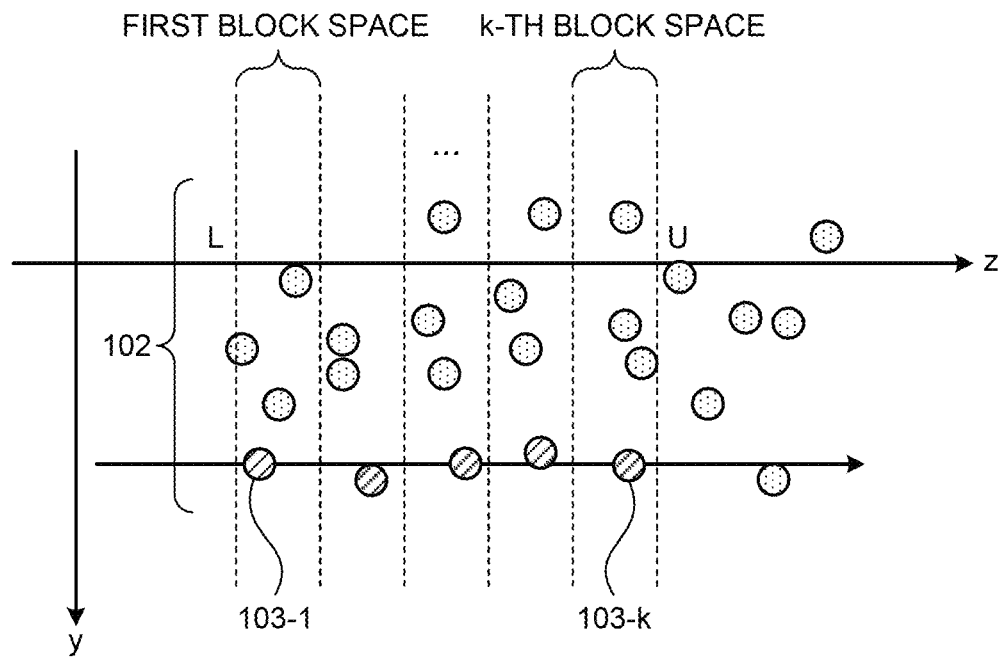
FIG. 5 is an explanatory diagram for explaining an example of a selection method for selecting representative points according to the embodiment.

FIG. 5 is an explanatory diagram for explaining an example of the selection method implemented by the selecting unit 21 for selecting representative points according to the embodiment. In FIG. 5, the three-dimensional points 102 extracted by the extracting unit 17 and the block spaces obtained by division by the dividing unit 19 are illustrated in the yz plane. In the example illustrated in FIG. 5, in each block space, the selecting unit 21 selects the three-dimensional point having the highest y-coordinate value as the representative point. In the first block space, a three-dimensional point 103-1 is selected as the representative point. In the k-th block space, a three-dimensional point 103-$k$ is selected as the representative point.

The estimating unit 23 estimates, as the surface for motion on which the mobile object 1 moves, the surface that approximates a plurality of representative points selected by the selecting unit 21.

Figure 6:
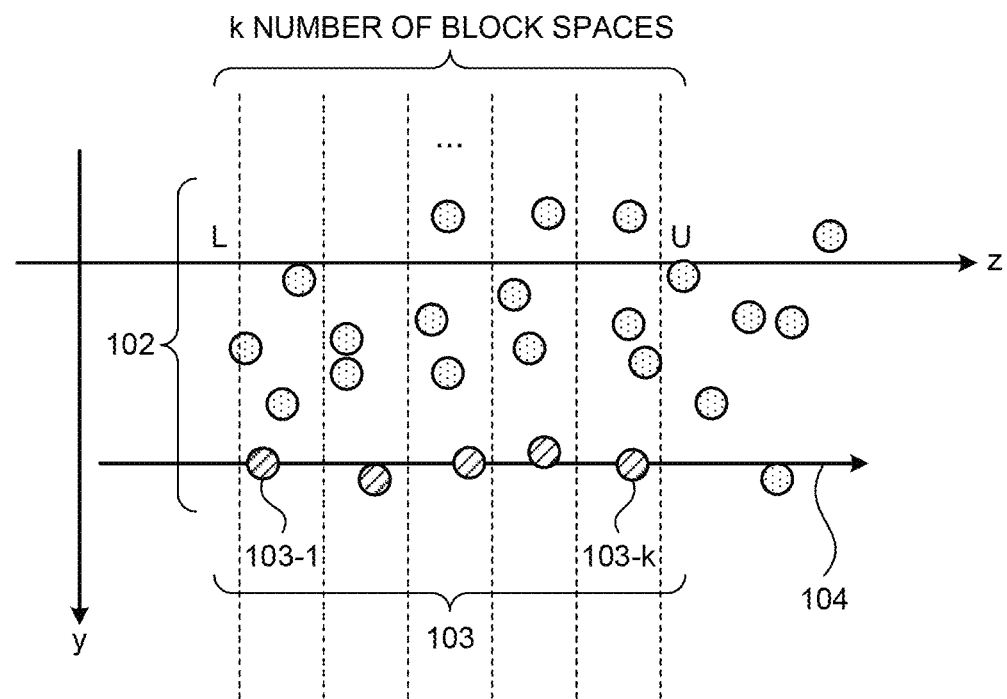
FIG. 6 is an explanatory diagram for explaining an example of an estimation method for estimating the surface for motion according to the embodiment.

FIG. 6 is an explanatory diagram for explaining an example of the estimation method implemented by the estimating unit 23 for estimating the surface for motion according to the embodiment. In FIG. 6, the block spaces obtained by division by the dividing unit 19 and the k number of representative points 103 selected by the selecting unit 21 are illustrated in the yz plane. In the example illustrated in FIG. 6, the estimating unit 23 estimates, as the surface for motion on which the mobile object 1 moves, a surface 104 that approximates the k number of representative points 103 selected by the selecting unit 21 (in the yz plane illustrated in FIG. 6, the surface 104 is illustrated as a straight line).

The detecting unit 25 detects, as obstacles, such three-dimensional points in the three-dimensional point group obtained by the measuring unit 11 which are not present on the surface for motion as estimated by the estimating unit 23.

Figure 7:
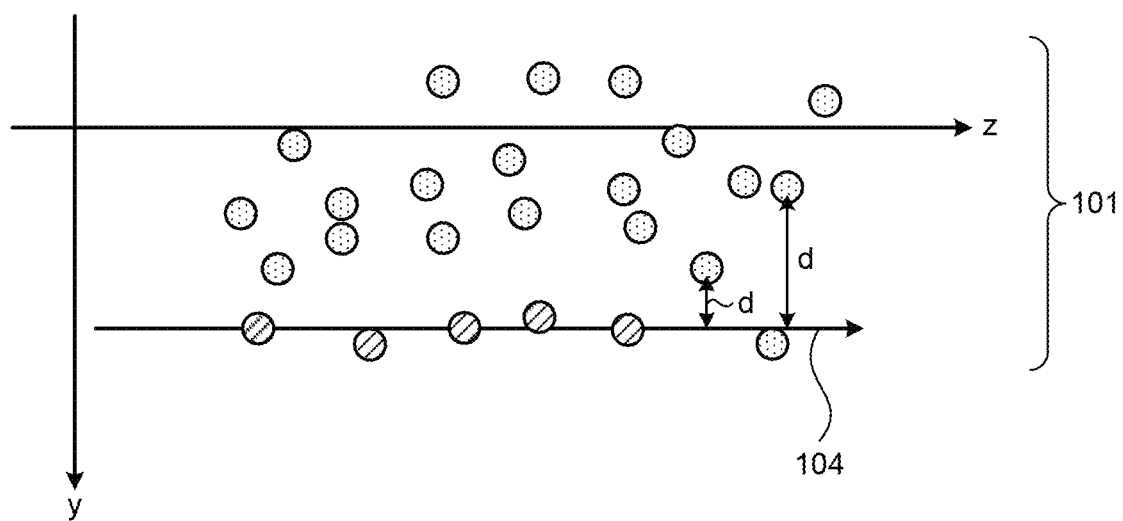
FIG. 7 is an explanatory diagram for explaining an example of a detection method for detecting obstacles according to the embodiment.

FIG. 7 is an explanatory diagram for explaining an example of the detection method implemented by the detecting unit 25 for detecting obstacles according to the embodiment. In FIG. 7, the three-dimensional point group 101 obtained by the measuring unit 11 and the surface 104 for motion as estimated by the estimating unit 23 are illustrated in the yz plane. In the example illustrated in FIG. 7, for each three-dimensional point included in the three-dimensional point group 101, the detecting unit 25 calculates a distance d to the surface 104 for motion in the y-axis direction and detects, as the three-dimensional points constituting obstacles, the three-dimensional points having the distance d to be equal to or greater than an error.

Herein, the error implies the measurement error in the three-dimensional measurement performed by the measuring unit 11. Moreover, the measurement error in the three-dimensional measurement differs according to the three-dimensional measurement method. Generally, as compared to the three-dimensional measurement performed using an image sensor, the three-dimensional measurement performed using a laser sensor has a smaller measurement error.

Figure 8:
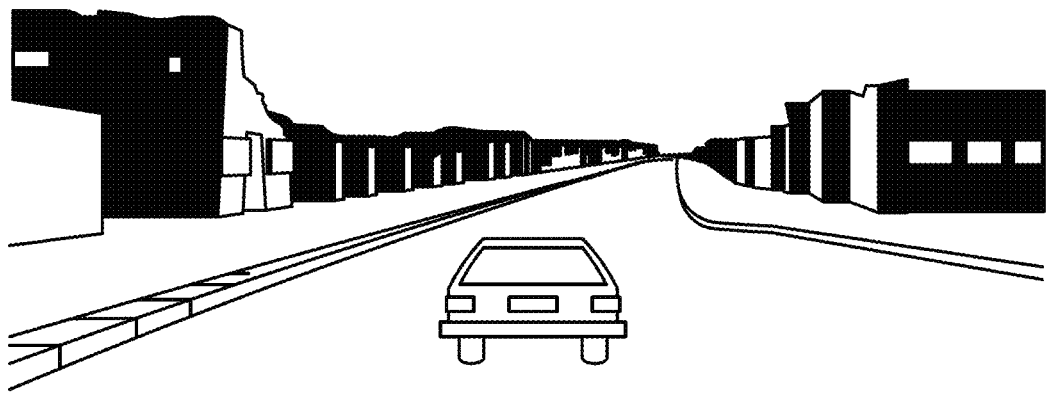
FIG. 8 is a diagram illustrating an exemplary image generated according to the embodiment.

The processing unit 27 performs operations according to the detection result obtained by the detecting unit 25. For example, based on the detection result obtained by the detecting unit 25, the processing unit 27 generates an image in which the surface for motion for the mobile object 1 and the obstacles are visualized as illustrated in FIG. 8.

Figure 9:
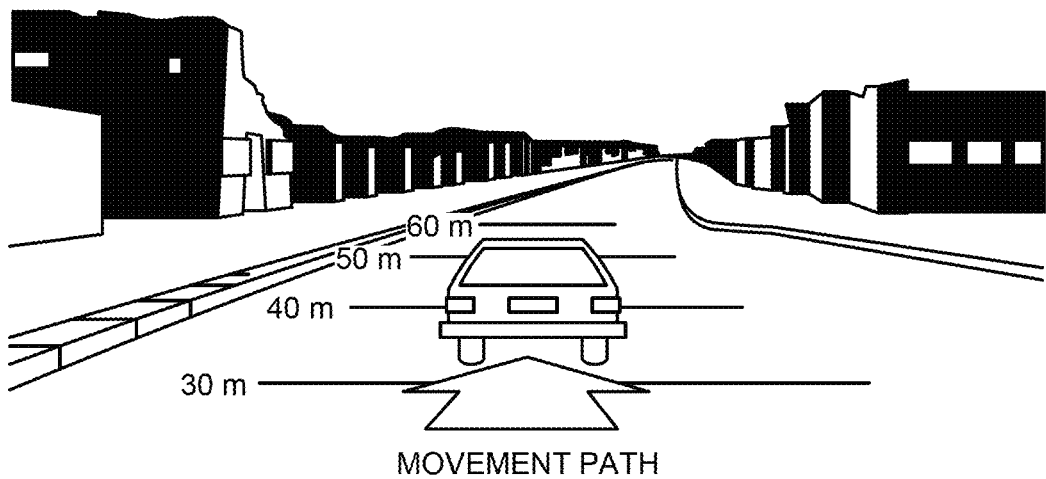
FIG. 9 is a diagram illustrating an exemplary image generated according to the embodiment.

Moreover, for example, based on the detection result obtained by the detecting unit 25, in addition to generating an image in which the surface for motion for the mobile object 1 and the obstacles are visualized, the processing unit 27 calculates the movement path of the mobile object 1; clips the lengths equivalent to braking distances on the movement path; and superimposes the movement path and the braking distances on the generated image so as to generate an image illustrated in FIG. 9.

Furthermore, for example, based on the detection result obtained by the obtaining unit 25, the processing unit 27 determines whether or not any obstacle is present within a distance determined in advance with reference to the mobile object 1.

The output unit 29 performs output based on the detection result obtained by the detecting unit 25. More particularly, the output unit 29 outputs the processing result obtained by the processing unit 27.

For example, when the image illustrated in FIG. 8 or FIG. 9 is generated by the processing unit 27, the output unit 29 outputs the image to a display device (not illustrated) (for example, the display of the car navigation installed in the mobile object 1).

Moreover, for example, when it is determined by the processing unit 27 that an obstacle is present within a predetermined distance (for example, within 30 m) with reference to the mobile object 1, the output unit 29 instructs an audio output device (not illustrated) (for example, the speaker of the car navigation installed in the mobile object 1) to output an audio output (in the example illustrated in FIG. 10, an audio output of "30 m till collision") as a notification about the risk of collision with the obstacle.

Figure 11:
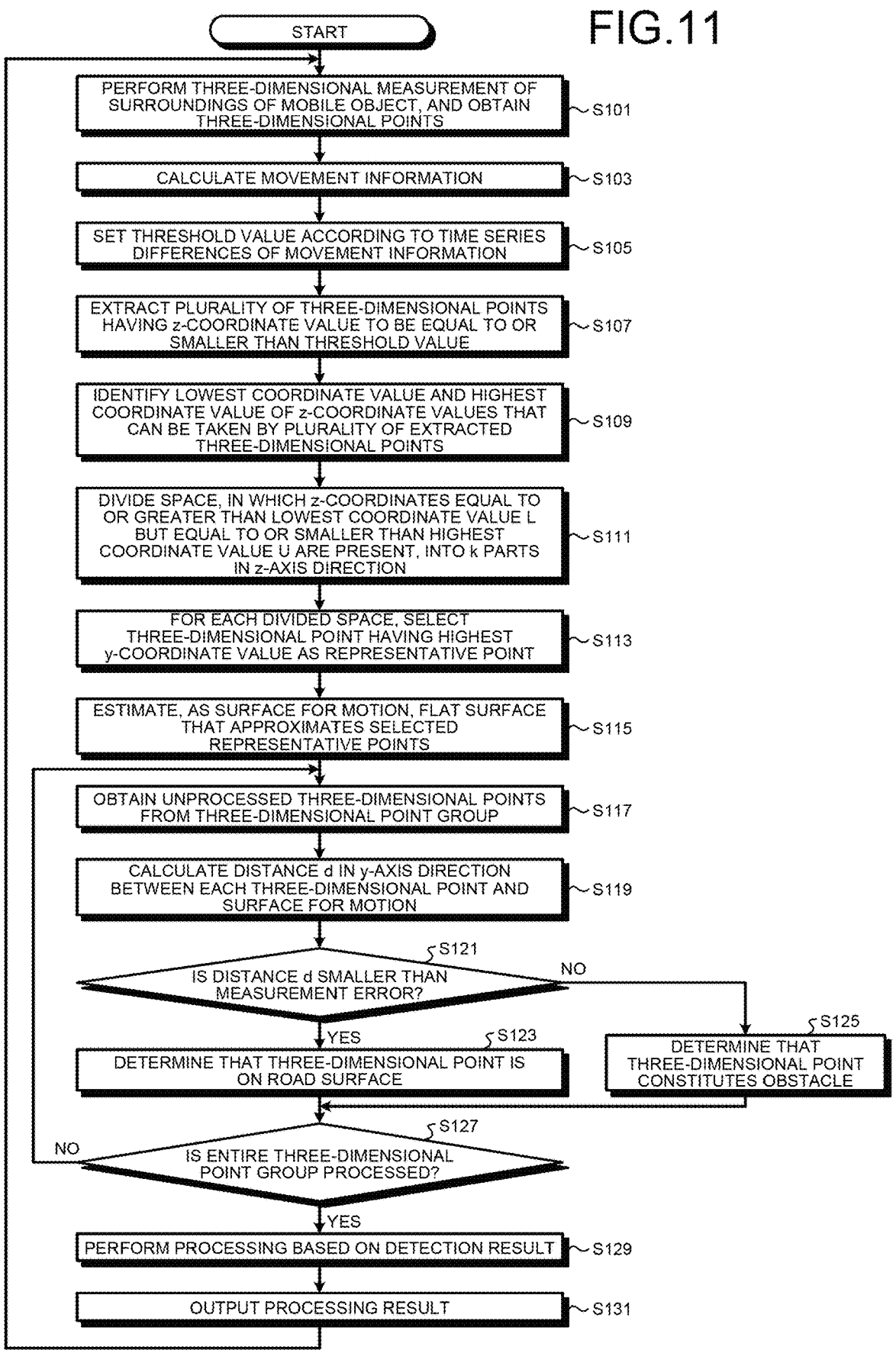
FIG. 11 is a flowchart for explaining exemplary operations performed according to the embodiment.

FIG. 11 is a flowchart for explaining an exemplary flow operations performed according to the embodiment.

Firstly, the measuring unit 11 performs three-dimensional measurement of the surroundings of the mobile object 1 based on the detection information obtained by the sensor used for three-dimensional measurement in the sensor group 2 so as to obtain a three-dimensional point group (Step S101).

Then, the calculating unit 13 calculates movement information of the mobile object 1 based on the detection information obtained by the sensor used for movement information calculation in the sensor group 2 (Step S103).

Subsequently, the setting unit 15 sets a threshold value based on the time series differences in the movement information calculated by the calculating unit 13 (Step S105).

Then, the extracting unit 17 extracts, from the three-dimensional point group obtained by the measuring unit 11, a plurality of three-dimensional points having the z-coordinate value to be equal to or smaller than the threshold value set by the setting unit 15 (Step S107).

Subsequently, the dividing unit 19 identifies the lowest coordinate value L and the highest coordinate value U of the z-coordinate values that can be taken by the three-dimensional points extracted by the extracting unit 17 (Step S109).

Then, the dividing unit 19 evenly divides the space, in which the z-coordinates equal to or greater than the lowest coordinate value L but equal to or smaller than the highest coordinate value U are present, into k parts (k≥2) in the z-axis direction; and forms k number of block spaces (Step S111).

Subsequently, for each divided space obtained by division by the dividing unit 19, the selecting unit 21 selects, as the representative point, the three-dimensional point having the highest y-coordinate value from among the three-dimensional points included in the divided space (Step S113).

Then, the estimating unit 23 estimates, as the surface for motion on which the mobile object 1 moves, the flat surface that approximates a plurality of representative points selected by the selecting unit 21 (Step S115).

Subsequently, the detecting unit 25 detects unprocessed three-dimensional points from the three-dimensional group obtained by the measuring unit 11 (Step S117).

Then, the detecting unit 25 calculates the distance d in the y-axis direction between each obtained three-dimensional point and the surface for motion as estimated by the estimating unit 23 (Step S119).

If the calculated distance d is smaller than the measurement error (Yes at Step S121), then the detecting unit 25 detects that the corresponding three-dimensional point is a three-dimensional point on the road surface (Step S123).

On the other hand, if the calculated distance d is equal to or greater than the measurement error (No at Step S121), then the detecting unit 25 detects that the corresponding three-dimensional point is a three-dimensional point of an obstacle (Step S125).

Until the entire three-dimensional point group obtained by the measuring unit 11 is processed (No at Step S127), the detecting unit 25 repeatedly performs the operations from Steps S117 to S125.

Once the entire three-dimensional point group obtained by the measuring unit 11 is processed (Yes at Step S127), the processing unit 27 performs operations based on the detection result obtained by the detecting unit 25 (Step S129).

Then, the output unit 29 outputs the result of operations performed by the processing unit 27 (Step S131).

Subsequently, the system control returns to Step S101.

In this way, according to the embodiment, the surface for motion for a mobile object is estimated using the movement information of the mobile object. Therefore, the surface for motion can be estimated by taking into account the effect accompanying the movement of the mobile object. That enables achieving enhancement in the estimation accuracy of the surface for motion.

More particularly, in the embodiment, the threshold value is set smaller when the differences in the orientation or the speed of the mobile object are greater. Thus, even if there is an increase in the differences in the orientation or the speed of the mobile object, the accuracy of three-dimensional measurement does not easily decline due to the differences, and the surface for motion for the mobile object is estimated using the three-dimensional points in the portion close to the mobile object. That enables achieving enhancement in the estimation accuracy of the surface for motion.

Meanwhile, since the accuracy of three-dimensional measurement is easily affected by the orientation of the mobile object, it is desirable to use the orientation of the mobile object as the movement information. However, when there is a large differences in the orientation of the mobile object, it is often the case that the differences in the speed of the mobile object is also large. Hence, it is alternatively possible to use the speed of the mobile object as the movement information.

Moreover, according to the embodiment, since the surface for motion for the mobile object can be estimated with accuracy, detecting the obstacles using the estimated surface for motion enables achieving enhancement in the detection accuracy of obstacles too.

For that reason, in an image in which the surface for motion for the mobile object 1 and the obstacles are visualized as illustrated in FIG. 8, the position of the surface for motion for the mobile object 1 and the positions of the obstacles are reproduced with high accuracy, thereby making it possible to support the driving of the driver of the mobile object 1. On the other hand, in case the position of the surface for motion for the mobile object 1 and the positions of the obstacles are reproduced with poor accuracy, it becomes a hindrance to the driving of the driver of the mobile object 1.

In an identical manner, in an image in which the surface for motion for the mobile object 1, the obstacles, the movement path, and the braking distances are visualized as illustrated in FIG. 9; the position of the surface for motion for the mobile object 1, the positions of the obstacles, the position of the movement path, and the positions of the braking distances are reproduced with high accuracy, thereby making it possible to support the driving of the driver of the mobile object 1. On the other hand, in case the position of the surface for motion for the mobile object 1, the positions of the obstacles, the position of the movement path, and the positions of the braking distances are reproduced with poor accuracy, it becomes a hindrance to the driving of the driver of the mobile object 1.

Figure 10:
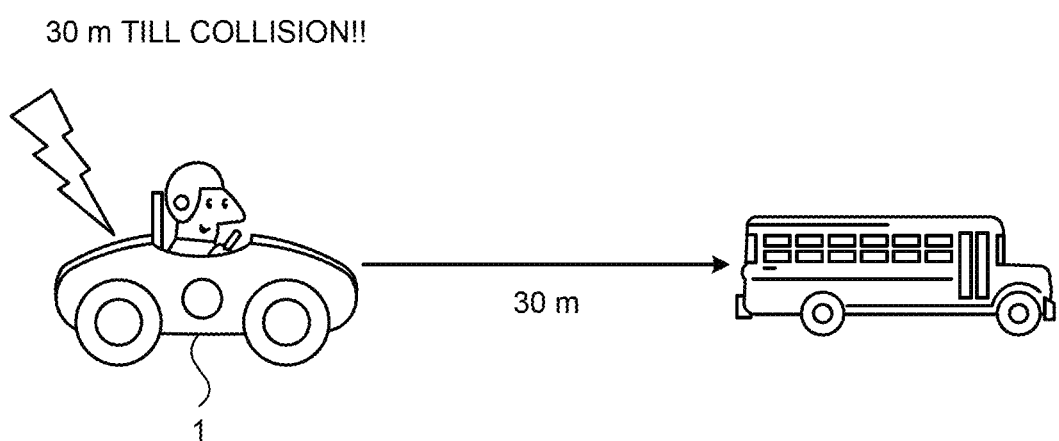
FIG. 10 is a diagram illustrating an example of the output according to the embodiment.

Meanwhile, since the positional relationship between the mobile object 1 and the obstacles can also be determined with precision, the risk of collision with an obstacle as illustrated in FIG. 10 can also be notified with high accuracy. On the other hand, if the positional relationship between the mobile object 1 and the obstacles cannot be determined with precision, then a notification may get issued regardless of the fact that there is no risk of collision with an obstacle or a notification may get issued at a stage in which it is no more possible to avoid collision with an obstacle. That is, it is not possible to support the driving of the driver of the mobile object 1.

Modification Example

In a modification example, the explanation is given for an example of performing automatic control of the movement of a mobile object. The following explanation is given mainly about the differences with the embodiment. Moreover, the constituent elements having identical functions to the embodiment are referred to by the same names and the same reference numerals, and the explanation thereof is not repeated.

Figure 12:
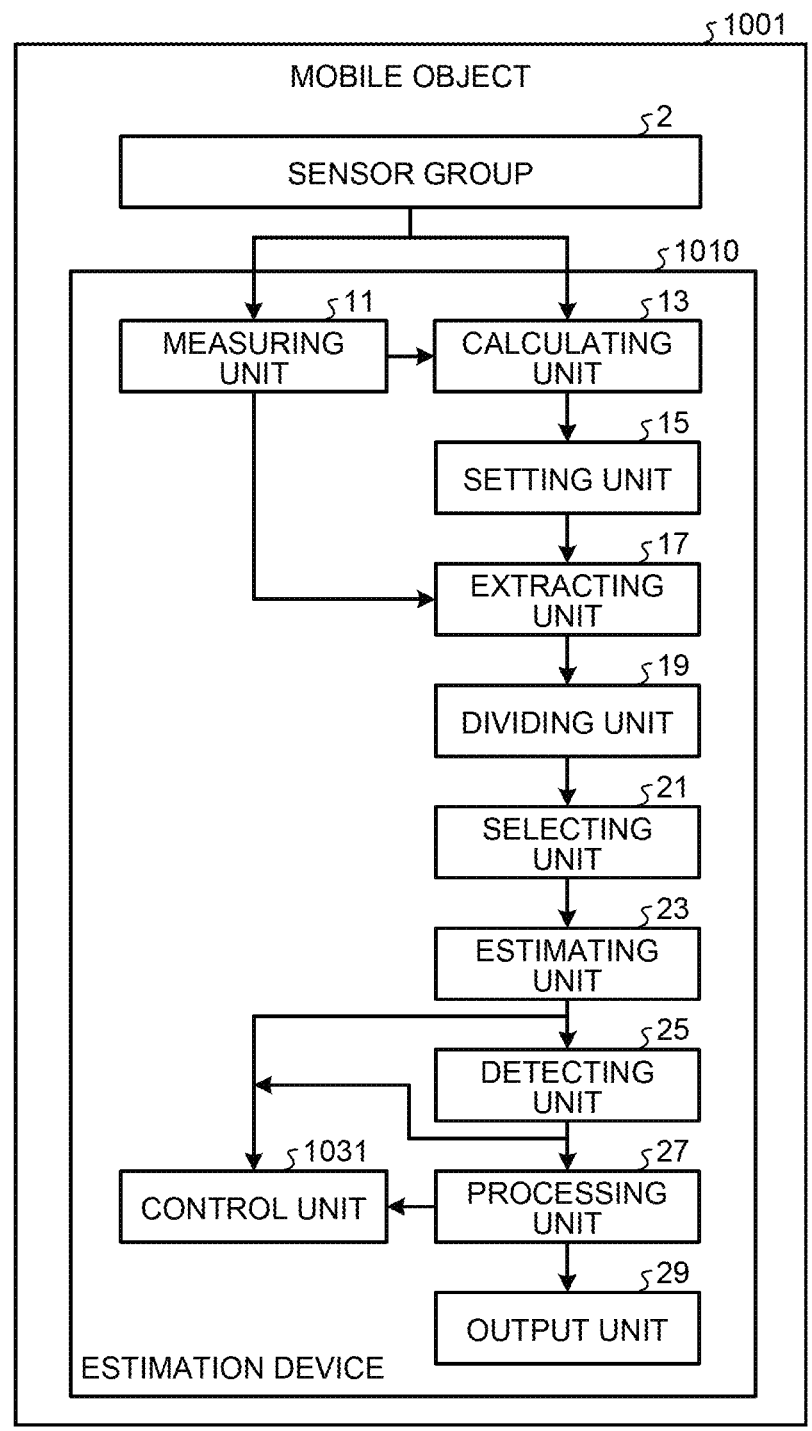
FIG. 12 is a diagram illustrating an exemplary configuration of an estimation device according to a modification example.

FIG. 12 is a diagram illustrating an exemplary configuration of an estimation device 1010 according to the modification example. As illustrated in FIG. 12, the estimation device 1010 is installed in a mobile object 1001, and includes a control unit 1031 in addition to the configuration according to the embodiment.

The control unit 1031 controls the movement of the mobile object 1001 based on at least one of the estimation result obtained by the estimating unit 23, the detection result obtained by the detecting unit 25, and the processing result obtained by the processing unit 27.

For example, the control unit 1031 controls the torque of the tires of the mobile object 1001 according to the gradient of the surface for motion estimated by the estimating unit 23. More particularly, the control unit 1031 makes the torque of the tires greater when the gradient of the surface for motion in the positive direction is greater such as an upslope. On the other hand, the control unit 1031 makes the torque of the tires smaller when the gradient of the surface for motion in the negative direction is greater such as a downslope.

Moreover, for example, the control unit 1031 can control the movement of the mobile object 1001 according to the movement path of the mobile object 1001 as calculated by the processing unit 27.

Furthermore, for example, when it is determined by the processing unit 27 that an obstacle is present within a predetermined distance (for example, within 30 m) with reference to the mobile object 1001, the control unit 1031 can perform control to reduce the torque of the tires and to put on the brakes.

As described above, it is possible to enhance the estimation accuracy of the surface for motion for the mobile object and to enhance the detection accuracy of the obstacles. Hence, if movement control of the mobile object is performed based on at least one of the estimation result obtained by the estimating unit, the detection result obtained by the detecting unit, and the processing result obtained by the processing unit; the accuracy of movement control can also be enhanced and highly accuracy automatic control can be expected.

Hardware Configuration

Figure 13:
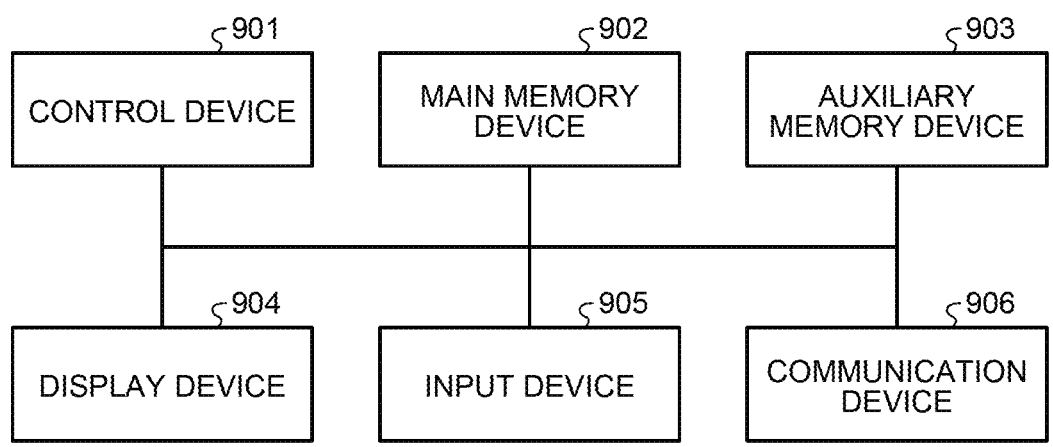
FIG. 13 is a diagram illustrating an exemplary hardware configuration of the estimation device according to the embodiment and the modification example.

FIG. 13 is a diagram illustrating an exemplary hardware configuration of the estimation device according to the embodiment and the modification example. As illustrated in FIG. 13, the estimation device according to the embodiment and the modification example has the hardware configuration of a general-purpose computer that includes a control device 901 such as a central processing unit (CPU), a main memory device 902 such as a read only memory (ROM) or a random access memory (RAM), an auxiliary memory device 903 such as a hard disk drive (HDD) or a solid state drive (SSD), a display device 904 such as a display, an input device 905 such as a keyboard or a mouse, and a communication device 906 such as a communication interface.

The computer programs executed in the estimation device according to the embodiment and the modification example are stored as installable or executable files in a computer-readable memory medium such as a compact disk read only memory (CD-ROM), a compact disk recordable (CD-R), a memory card, a digital versatile disk (DVD), or a flexible disk (FD).

Alternatively, the computer programs executed in the estimation device according to the embodiment and the modification example can be stored in a downloadable manner in a computer connected to a network such as the Internet. Still alternatively, the computer programs executed in the estimation device according to the embodiment and the modification example can be distributed via a network such as the Internet. Still alternatively, the computer programs executed in the estimation device according to the embodiment and the modification example can be stored in advance in a ROM or the like.

The computer programs executed in the estimation device according to the embodiment and the modification example contain modules of the abovementioned constituent elements for the purpose of implementing the constituent elements in a computer. As the actual hardware, a CPU reads the computer programs from a ROM or an HDD into a RAM and executes them so that the constituent elements are implemented in the computer.

For example, unless contrary to the nature thereof, the steps of the flowchart according to the embodiment described above can have a different execution sequence, can be executed in plurality at the same time, or can be executed in a different sequence every time.

As described above, according to the embodiment and the modification example, it becomes possible to enhance the estimation accuracy of the surface for motion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An estimation device comprising:
processing circuitry configured to:
perform three-dimensional measurement of surroundings of a vehicle to obtain a three-dimensional point group;
obtain movement information corresponding to movement of the vehicle;
obtain a threshold value based on time series differences in the movement information;
extract, from the three-dimensional group, a plurality of points for which distance to the vehicle in a moving direction of the vehicle is equal to or smaller than the threshold value;
divide a space, in which the extracted points are present, into a plurality of divided spaces in the moving direction;
for each respective divided space, select a representative point from among points included in the respective divided space;

estimate, as a road surface on which the vehicle moves, a surface which approximates the representative points;

detect, as an obstacle, a point in the three-dimensional point group which is not present on the road surface, in a range including a point of the three-dimensional point group for which the distance to the vehicle in the moving direction of the vehicle is greater than the threshold value; and output information on the three-dimensional point detected as the obstacle, wherein the processor is configured to obtain smaller threshold values as time series differences in the movement information increase.

2. The device according to claim 1, wherein the threshold value is obtained by applying, to a monotonically decreasing function, a value indicating the time series differences in the movement information.

3. The device according to claim 1, wherein
the processing circuitry is configured to select, as the representative point, a lowest point in a vertical direction from among points included in the divided space.

4. The device according to claim 1, wherein the processing circuitry is configured to:
perform operations based on the point detected as the obstacle, and
output a result of the operations.

5. The device according to claim 1, wherein the processing circuitry is configured to control movement of the vehicle based on at least one of the surface estimated as the road surface and the point detected as the obstacle.

6. The device according to claim 1, wherein the movement information represents information indicating at least one of orientation or speed of the vehicle.

7. The device according to claim 1, wherein the estimation device is installed in the vehicle.

8. An estimation method comprising:
performing three-dimensional measurement of surroundings of a vehicle to obtain a three-dimensional point group;
successively obtaining movement information corresponding to movement of the vehicle;
obtaining a threshold value based on time series differences in the movement information;
extracting, from the three-dimensional group, a plurality of points for which distance to the vehicle in a moving direction of the vehicle is equal to or smaller than the threshold value;
dividing a space, in which the extracted points are present, into a plurality of divided spaces in the moving direction;
for each respective divided space, selecting a representative point from among points included in the respective divided space;
estimating, as a road surface on which the vehicle moves, a surface which approximates the representative points;
detecting, as an obstacle, a point in the three-dimensional point group which is not present on the road surface, in a range including a point of the three-dimensional point group for which the distance to the vehicle in the moving direction of the vehicle is greater than the threshold value; and
outputting information on the three-dimensional point detected as the obstacle,
wherein smaller threshold values are obtained as the time series differences in the movement information increase.

9. An estimation device comprising:
a processor; and
a memory that stores processor-executable instructions that, when executed by the processor, cause the processor to:
perform three-dimensional measurement of surroundings of a vehicle to obtain a three-dimensional point group;
obtain movement information corresponding to movement of the vehicle;
obtain a threshold value based on time series differences in the movement information;
extract, from the three-dimensional group, a plurality of points for which distance to the vehicle in a moving direction of the vehicle is equal to or smaller than the threshold value;
divide a space, in which the extracted points are present, into a plurality of divided spaces in the moving direction;
for each respective divided space, select a representative point from among points included in the respective divided space;
estimate, as a road surface on which the vehicle moves, a surface which approximates the representative points;
detect, as an obstacle, a point in the three-dimensional point group which is not present on the road surface, in a range including a point of the three-dimensional point group for which the distance to the vehicle in the moving direction of the vehicle is greater than the threshold value; and
output information on the three-dimensional point detected as the obstacle,
wherein the processor obtains smaller threshold values as the time series differences in the movement information increase.

\* \* \* \* \*